(12) United States Patent
Kulikov

(10) Patent No.: US 8,499,796 B1
(45) Date of Patent: Aug. 6, 2013

(54) PIPELINE PRESSURE STABILIZATION APPARATUS AND METHOD

(76) Inventor: Vadim Gennadyevich Kulikov, Moscow (RU)

( * ) Notice: Subject to any disclaimer, the term of this patent is extended or adjusted under 35 U.S.C. 154(b) by 86 days.

(21) Appl. No.: 13/011,393

(22) Filed: Jan. 21, 2011

Related U.S. Application Data

(60) Division of application No. 11/776,203, filed on Jul. 11, 2007, now Pat. No. 7,874,317, which is a continuation-in-part of application No. 11/750,779, filed on May 18, 2007, now Pat. No. 7,562,678.

(51) Int. Cl.
*F16L 55/04* (2006.01)

(52) U.S. Cl.
USPC ............................. 138/30; 138/26; 137/207

(58) Field of Classification Search
USPC ...................... 138/26, 30; 137/207
See application file for complete search history.

(56) References Cited

U.S. PATENT DOCUMENTS

| | | | | |
|---|---|---|---|---|
| 2,354,201 A | * | 7/1944 | Dand et al. | 138/30 |
| 2,808,070 A | * | 10/1957 | Malsbary | 138/26 |
| RE24,390 E | * | 11/1957 | Everett | 138/30 |
| 3,536,102 A | * | 10/1970 | Zahid et al. | 138/30 |
| 3,625,242 A | * | 12/1971 | Ostwald | 138/30 |
| 4,163,461 A | * | 8/1979 | Jacobellis | 138/30 |
| 4,432,393 A | * | 2/1984 | Mills | 138/30 |
| 4,759,387 A | * | 7/1988 | Arendt | 138/30 |
| 4,911,204 A | * | 3/1990 | Martin | 138/30 |
| 6,672,337 B2 | * | 1/2004 | Kobayashi et al. | 138/30 |

* cited by examiner

*Primary Examiner* — Patrick F Brinson
(74) *Attorney, Agent, or Firm* — Gold & Rizvi, P.A.; Glenn E. Gold

(57) ABSTRACT

A pressure stabilizer for mediating changes in pressure within a pipeline is provided. The pressure stabilizer incorporates a plurality of perforations about a central pipeline and a circumferential enclosure about the perforations. This structure allows excess fluid to flow from the central pipeline into the space provided between the central pipeline and the circumferential enclosure. As the pressure increases within the overflow space, the medium applies a pressure to an elastomeric membrane, which in turn transfers the pressure to a plurality of dampening materials. The elastomeric membrane can be filled with a porous material providing a smoother transition within the pressure dampening process. The elastomeric membrane and respective dampening materials can be placed within the circumferential enclosure assembled about the central pipeline or utilized with a pressure-stabilizing chamber.

18 Claims, 8 Drawing Sheets

PIPELINE PRESSURE STABILIZATION APPARATUS AND METHOD

This patent application is a Divisional Application which claims priority to Continuation in Part application Ser. No. 11/776,203 filed on Jul. 11, 2007, which claims priority to Non-Provisional application Ser. No. 11/750,779 filed on May 18, 2007 which are all incorporated in their entireties by reference.

FIELD OF THE INVENTION

This invention relates generally to the art of pipeline systems, and more particularly a method and apparatus for stabilizing the pressure within a pipeline.

BACKGROUND OF THE INVENTION

Pipelines are used to transport stable fluids (pure fluids) and complex fluids (such as oils, sewage, etc. and normally characterized having relatively large particles, gasses and the like, mixed in the fluid). Pipelines are subjected to severe wear, with the average wear of the pipeline systems and equipment exceeding 65%. According to official data, the annual number of ruptures and accidents within the housing and utilities infrastructure in Russia exceeds 600,000 incidents. Accidents in pipelines that carry hazardous materials such as oil, chemical, and other such harsh mediums can bring about harsh environmental and social consequences.

Pipeline failures are generally broken down as follows:

a. 60% result from hydraulic surges, pressure changes, and vibrations;

b. 25% result from corrosion; and c. 15% result from natural phenomena and force majeure circumstance.

Pneumo-hydraulic devices are subject to changes in pressure. An example includes a pressure pipeline during pumping of a working medium, wherein the pressure changes as a result of the pressure pump systems and the impacts occurring by the closure of valves and valve gates.

The pressure can be imparted in many forms, including, for example, a moving wave transmitted through the pipeline. Additionally, extreme hazardous conditions, such as forces matching resonance frequencies, can occur.

Pipelines can be of a variety of diameters. Pipelines having large diameters are used for the transfer of large volumes of fluids. Pipelines having smaller diameters are used for a more localized transfer of smaller volumes, such as residential type pipelines, and can encounter the same issues noted above.

What is desired is an apparatus that stabilizes the pressure fluctuations within a pipeline. In addition to preventing ruptures and related hazardous conditions, it would be desirable to provide such an apparatus which minimizes, and preferably eliminates, audible sounds that often emanate from pipes under pressure (i.e., sometimes referred to as the "singing pipe" problem). At one end of the spectrum, such noises can be annoying to hear, e.g., emanating from plumbing conduits. At the other end of the spectrum, such noises can kill fish and other sea life, which can also result in major fines for businesses responsible for the pipes. The parent application teaches a pipeline pressure stabilizer utilizing stabilizing members that are oriented generally perpendicular to the central pipeline, which requires a large area. What is desired is an effective stabilizing apparatus for pipelines having a stabilizing member that is condensed, thus providing a more compact configuration. The enhanced embodiment provides a stabilizing device applicable to micro-sized pipelines.

SUMMARY OF THE PRESENT INVENTION

A first aspect of the present invention provides an apparatus that stabilizes the pressure within a pipeline.

Yet another aspect of the present invention provides an apparatus that stabilizes the pressure within a pipeline used to transport a stable fluid.

Yet another aspect of the present invention provides a spring force as a means for stabilizing the pressure within a section of pipeline.

Yet another aspect of the present invention provides a dampening force as a means for stabilizing the pressure within a section of pipeline.

Yet another aspect of the present invention provides both a spring force and a dampening force as a means for stabilizing the pressure within a section of pipeline.

Yet another aspect of the present invention provides pipeline stabilization via a series of central pipeline perforations within a central pipeline and a cylindrical central pipeline enclosure placed about the central pipeline.

Yet another aspect of the present invention provides pipeline stabilization via a series of central pipeline perforations within a central pipeline, and a cylindrical central pipeline enclosure placed about the central pipeline, wherein the series of central pipeline perforations provides a path for the fluid to flow between the central pipeline and the cylindrical central pipeline enclosure.

Yet another aspect of the present invention provides a pressure-stabilizing chamber fluidly connected to at least one of the central pipeline and the cylindrical central pipeline enclosure.

Yet another aspect of the present invention provides a pressure-stabilizing chamber fluidly connected to and encircling the central pipeline and the cylindrical central pipeline enclosure.

Yet another aspect of the present invention provides a pressure-stabilizing chamber fluidly connected to and encircling the central pipeline and the cylindrical central pipeline enclosure, wherein the pressure-stabilizing chamber is oriented substantially parallel to the pipeline.

Yet another aspect of the present invention provides a pressure stabilizing chamber fluidly connected to and encircling the central pipeline, the pressure stabilizing chamber includes an elastic separation member located externally of the central pipeline and internal to the pressure stabilizing external body.

Yet another aspect of the present invention incorporates an elastic separation member providing a resistive force to a pressure change within the central pipeline.

Yet another aspect of the present invention provides a pressure-stabilizing chamber including an elastic membrane member providing a spring force against a fluid pressure force applied, resulting from an increase in pressure within the pipeline.

Yet another aspect of the present invention provides a pressure-stabilizing chamber including an elastic membrane member, the elastic membrane member providing a spring force against a fluid pressure force applied as a result of an increase in pressure within the pipeline, and further being fabricated of a molded rubber compound.

Yet another aspect of the present invention provides a pressure stabilizing chamber fluidly connected to and encircling the central pipeline, the pressure stabilizing chamber including at least one cylindrical dampening element fabricated of a dampening material and located externally of the central pipeline and internal to the pressure stabilizing external body.

Yet another aspect of the present invention provides a pressure-stabilizing chamber including a dampening material fabricated from a composite material such as Polyethylene and rubber or Silicone and rubber.

Yet another aspect of the present invention provides a pressure-stabilizing chamber including a dampening material fabricated from chopped up sections of used tires.

Yet another aspect of the present invention provides a pressure-stabilizing chamber including a dampening material fabricated from a composite material such as Polyethylene and rubber or Silicone and rubber, wherein the rubber further comprises chopped up sections of used tires.

Yet another aspect of the present invention provides at least one cylindrical dampening element that imparts a dampening force to a pressure change within the central pipeline.

Yet another aspect of the present invention provides a pressure stabilizing chamber fluidly connected to and encircling the central pipeline, the pressure stabilizing chamber including an elastic separation member located externally of the central pipeline and internal to the cylindrical dampening elements within the pressure stabilizing external body.

In yet another aspect of the present invention the elastic separation member provides a resistive force to the pressure change within the central pipeline, and the cylindrical dampening element(s) provides a dampening force to the pressure change within the central pipeline.

Yet another aspect of the present invention introduces spiraling springs between the elastic separation member and the cylindrical dampening element(s).

Yet another aspect of the present invention utilizes a pair of connection muffs at each end of the apparatus, the connection muffs providing a fluid and mechanical boundary assembling each of the central pipeline, the pressure stabilizing external body, and the resistance and damping members.

Yet another aspect of the present invention assembles the pair of connection muffs to the pressure stabilizing external body via any fluid sealing, mechanical fastening design.

Yet another aspect of the present invention assembles the pair of connection muffs to the pressure stabilizing external body via a threaded fastening design.

Yet another aspect of the present invention assembles the pair of connection muffs to the pressure stabilizing external body via a pipe-clamping design.

Yet another aspect of the present invention incorporates dampening securing rings (or similar device) between the various internal members of the pressure stabilizing system and the pair of connection muffs to minimize any movement along the length of the central pipeline.

Yet another aspect of the present invention incorporates fluid sealing device(s) between the various members of the pressure stabilizing system and the pair of connection muffs to ensure against fluid leaks.

Yet another aspect of the present invention is an increase of work effectiveness by a reduction of persistence of hydraulic path, which connects the central pipeline with the damping buildup, hydraulic, and wave resistance of hydraulic paths.

BRIEF DESCRIPTION OF THE DRAWINGS

For the purpose of initially illustrating the invention, the specification presents drawings, flow diagrams, and embodiments that are presently preferred as well as alternates. It should be understood, however, that the invention is not limited to the specific instrumentality and methods disclosed herein. It can be recognized that the figures represent a layout in which persons skilled in the art may make variations therein. In the drawings.

DETAILED DESCRIPTION OF THE DRAWING

Figure 1:
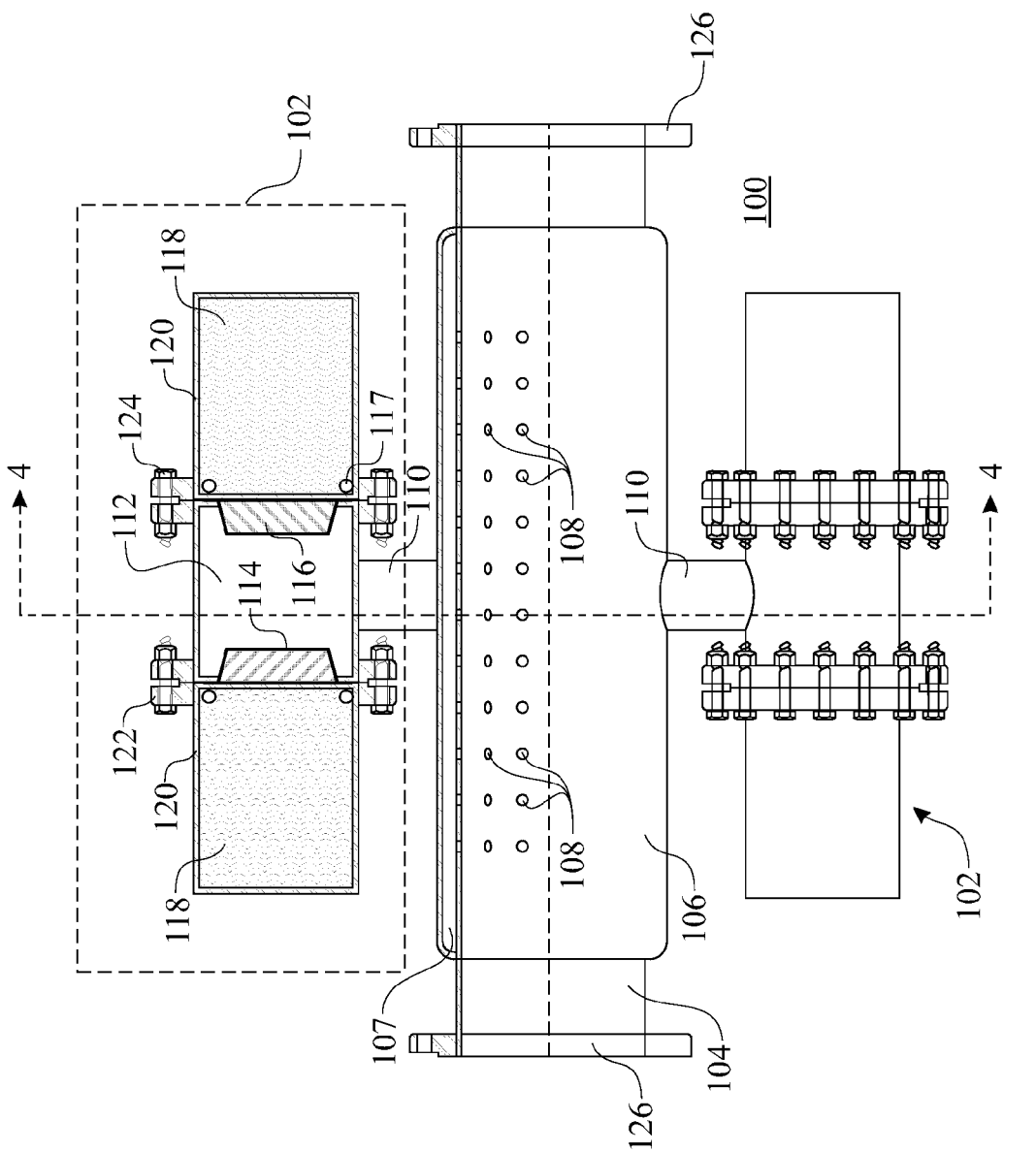
FIG. 1 presents an elevation view, including a partial sectional cut of a pipeline pressure stabilizer exemplary embodiment of the present invention.

FIG. 1 illustrates an elevation view of a pressure stabilized pipeline system 100, including a partial sectional view above the centerline of the pressure stabilized pipeline system 100. The pressure stabilized pipeline system 100 comprises at least one pressure stabilizing chamber 102 connected with fluid communication between a cylindrical central pipeline pressure stabilizing enclosure 106 and one or more pressure control receptacles 112 of the pressure stabilizing chamber 102 via one or more pressure control conduits 110. The cylindrical central pipeline pressure stabilizing enclosure 106 is assembled completely enclosing a section of the central pipeline 104. The central pipeline 104 includes a plurality of central pipeline perforations 108, wherein pumped medium can flow form the central pipeline 104, via the plurality of central pipeline perforations 108, into the dampening buildup section 107 of the cylindrical central pipeline pressure stabilizing enclosure 106. The central pipeline perforations 108 perform dissipation of the fluid, in much the same manner as Alveoli in human lungs. It is preferred that the central pipeline perforations 108 are evenly distributed about a wall of the central pipeline 104. The pressure-stabilizing chamber 102 comprises at least one elastic pressure membrane 114, wherein a highly porous elastomer 116 can be coupled to, or placed within, the elastic pressure membrane 114 as a contributor to a dampening force. A dampening chamber 120, which includes a dampening porous material 118, is assembled proximate the elastic pressure membrane 114 on a side opposing the pressure control receptacle(s) 112. The dampening porous material 118 can be a composite comprising Polyethylene and Rubber, Silicone and Rubber, and the like. The dampening porous material 118 is fabricated of at least two materials, wherein a first material and second material do not bind to each other. One such composition of the dampening porous material 118 can be manufactured by grinding used tires and pouring in a filler material such as Polyethylene. The dampening chamber 120 can be coupled to the pressure control receptacle(s) 112 via a stabilizing chamber assembly flange 122, wherein the stabilizing chamber assembly flange 122 is mechanically secured with a plurality of flange fastener(s) 124. The flange fastener(s) 124 are typically nuts, bolts, and washers engineered to meet the overall system requirements and respective safety factors. The material used for fabrication of the highly porous elastomer 116 is preferably distinctly different from the material used for fabrication of the dampening porous material 118. The material used for fabrication of the highly porous elastomer 116 is an elastomer having a high porosity. The material used for fabrication of the dampening porous material 118 is a dampening porous material. The elastic pressure membrane 114 is mechanically secured into the pressure-stabilizing chamber 102 such that it is sandwiched between each of the stabilizing chamber assembly flanges 122. The elastic pressure membrane 114 can be mechanically supported via a membrane support ring 117. The membrane support ring 117 can be any design engineered sufficiently to accommodate the required pressure and safety factors. The pressure stabilized pipeline system 100 can be integrated into the pipeline by securing the pressure stabilized pipeline system 100 to other pipeline members via a central piping assembly flange 126 and respective fasteners, such as the flange fastener(s) 124. It is recognized and illustrated that the pressure stabilized pipeline system 100 can comprise a pair of the central piping assembly flange(s) 126, with one located proximate each end of the section of the central pipeline 104.

Figure 2:
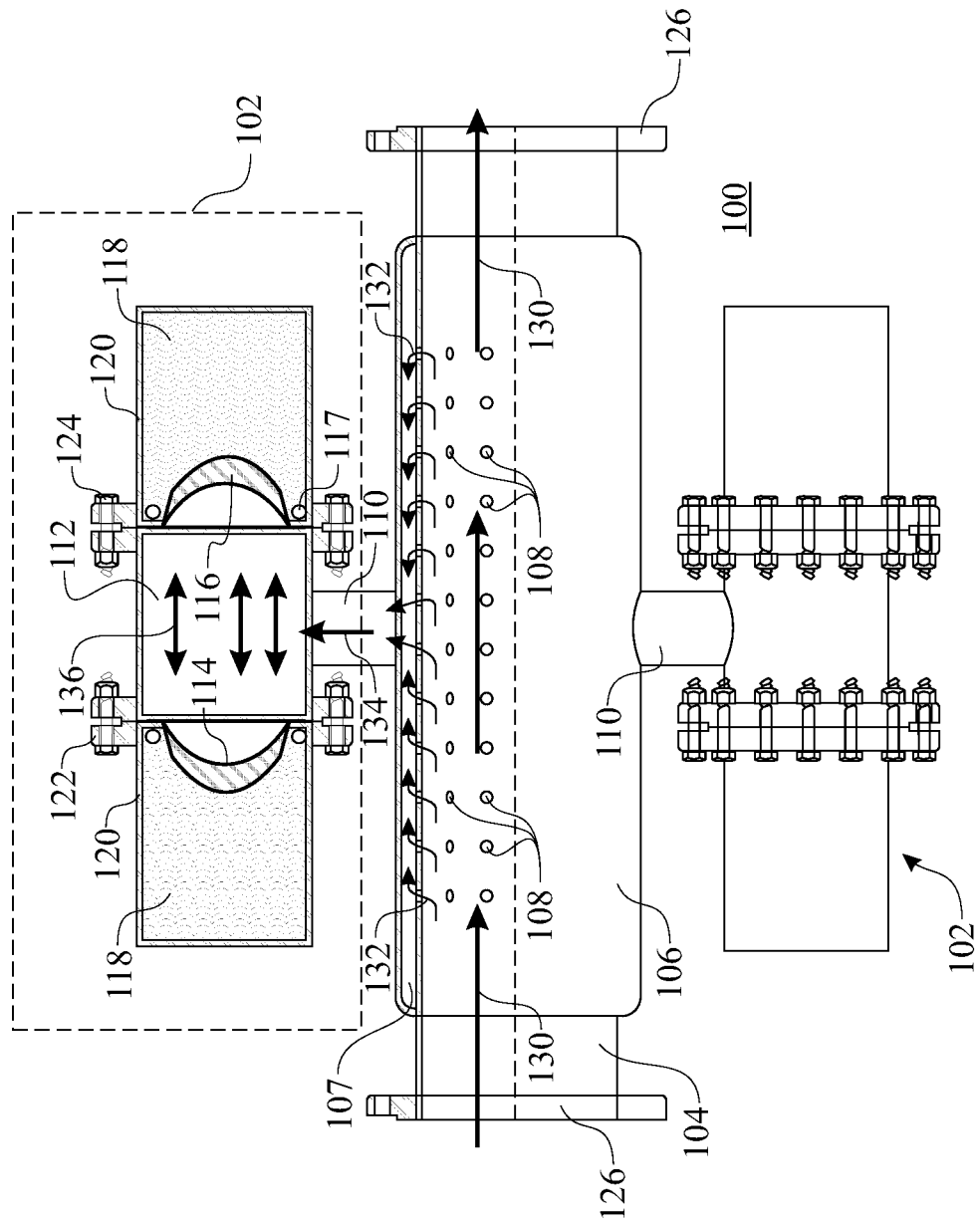
FIG. 2 presents the exemplary embodiment presented in FIG. 1, illustrating an excessive pressure condition.
Figure 3:
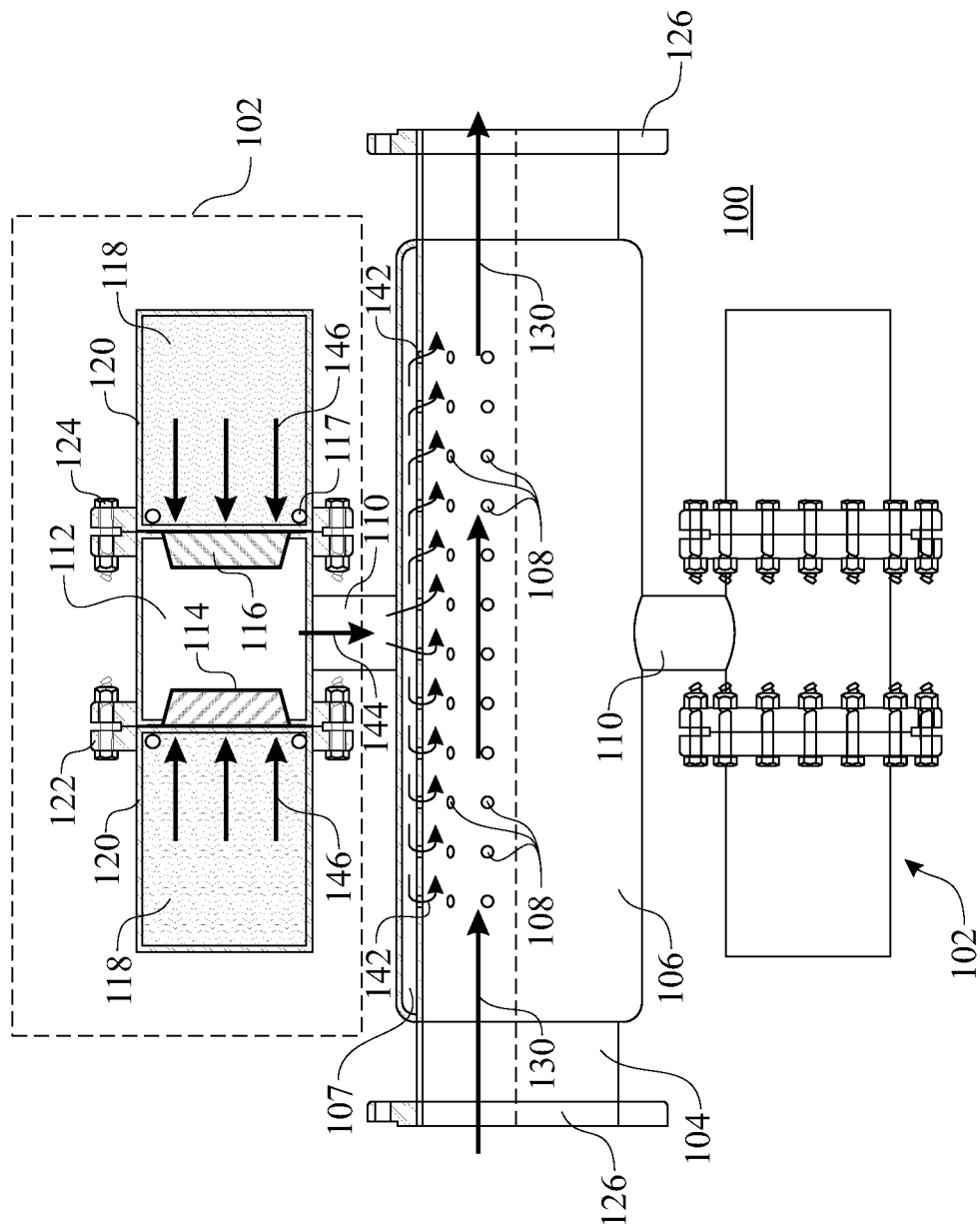
FIG. 3 presents the exemplary embodiment presented in FIG. 1, illustrating an reducing pressure condition.

FIGS. 2 and 3 illustrate the operation of the present invention, wherein FIG. 2 represents the pressure stabilized pipeline system 100 during an increasing pressure phase, and FIG. 3 presents the pressure stabilized pipeline system 100 during a decreasing pressure phase. An increasing pressure event can arise in the central pipeline 104 via a hydraulic impact, forced pressure oscillations, and the like. A working medium flow 130 passes through the central pipeline 104. As the working medium flow 130 passes through the central pipeline 104, when the working medium flow 130 is subject to an increase in pressure, a wave ensues, and the medium and any pressurized material flows in accordance to an excess fluid flow path 132. Continued flow in accordance with the excess fluid flow path 132 causes the dampening buildup section 107 to fill. As the dampening buildup section 107 fills, excess medium then flows, as excess pressurized fluid flow 134 through the pressure control conduits 110, and begins to fill the pressure control receptacle(s) 112. As the medium continues as excess pressurized fluid flow 134, the pressure control receptacle(s) 112 fills and pressurizes, generating a dampened pressure force 136. The dampened pressure force 136 is first dampened by a motion of the elastic pressure membrane 114 and the highly porous elastomer 116 coupled to the elastic pressure membrane 114. As the dampened pressure force 136 increases, the elastic pressure membrane 114 continues to expand into the dampening chamber 120, thereby compressing the dampening porous material 118. This continues until the volume of flow/pressure within the central pipeline 104 becomes less than the forces (a dampening return pressure force 146) applied to medium currently accumulated in the pressure control receptacle(s) 112. The dampening return pressure force 146 begins to return the accumulated medium towards the dampening buildup section 107, in accordance with a dampened pressure return flow 144. As the medium continues to return to the dampening buildup section 107, the medium returns to the working medium flow 130 via a reduced pressure return flow 142, flowing the medium through the plurality of the central pipeline perforations 108 and ultimately back to the working medium flow 130.

By providing the pressure stabilized pipeline system 100, the elastic pressure membrane 114 and the dampening porous material 118, in conjunction with the fluid collecting capabilities within the dampening buildup section 107 and the pressure control receptacle(s) 112, the system reduces the overall amplitude and frequency of changes in pressure of medium within the central pipeline 104. Essentially, the increase in work provided by the dampening materials of the pressure stabilized pipeline system 100 results in a decrease in persistence, hydraulic, and wave reduction of the fluid flow path.

Figure 4:
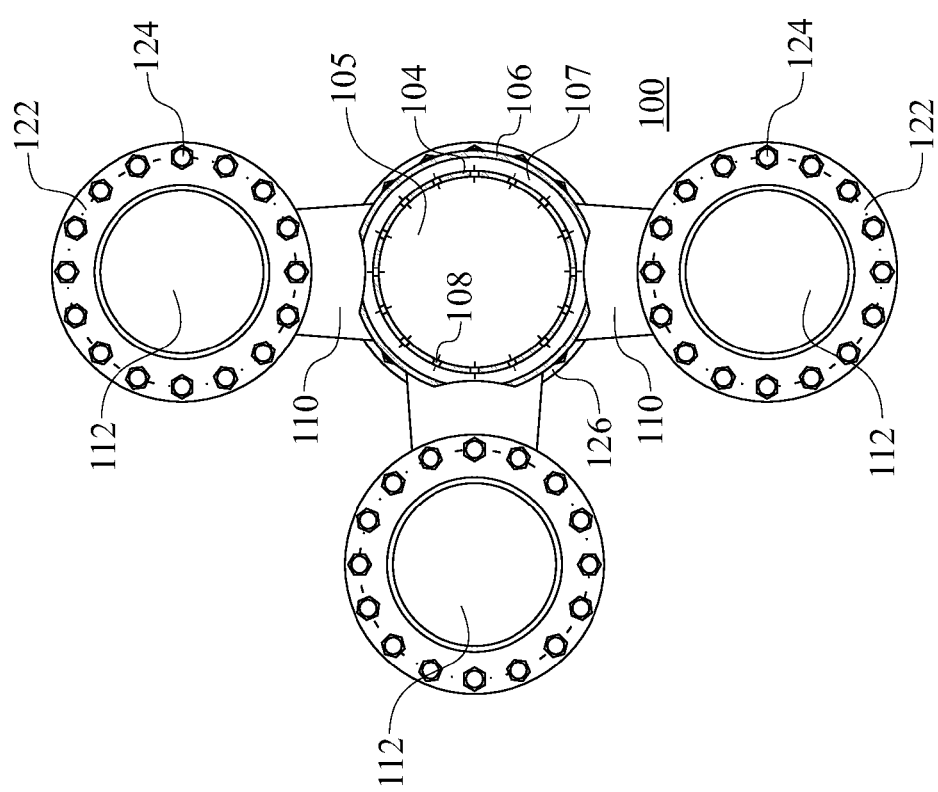
FIG. 4 presents an elevation, end sectional view of the exemplary embodiment presented in FIG. 1.
Figure 5:
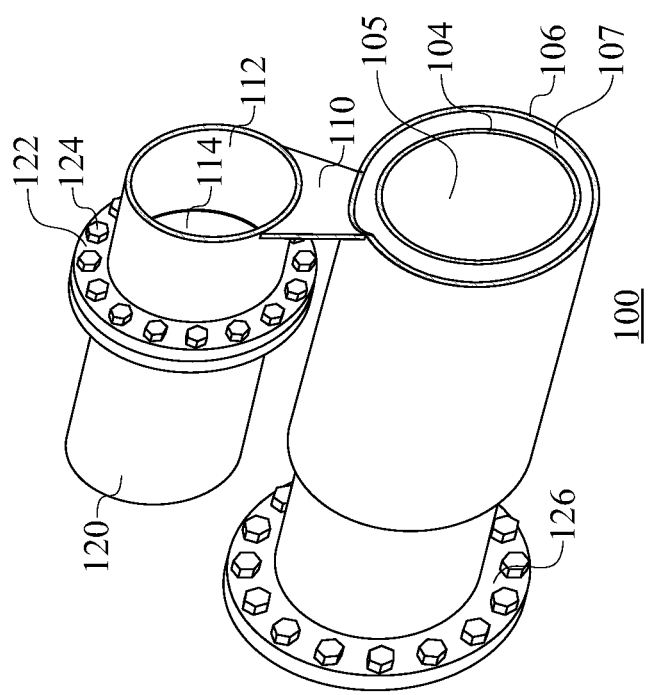
FIG. 5 presents an isometric, sectional view of the exemplary embodiment presented in FIG. 1.

FIGS. 4 and 5 illustrate a cross-sectional view 4-4 of FIG. 1. FIG. 4 illustrates an elevation view and FIG. 5 illustrates an isometric illustration for additional clarity. The illustration presents the central pipeline 104, which provides a central pipeline conduit 105 for the working medium flow 130. A plurality of the central pipeline perforations 108 provides fluid connectivity between the central pipeline conduit 105 and the dampening buildup section 107. The dampening buildup section 107 is a chamber created between the central pipeline 104 and the cylindrical central pipeline pressure-stabilizing enclosure 106, as illustrated. The dampening buildup section 107 is fluidly connected between the dampening buildup section 107 and the pressure control receptacle(s) 112 via a plurality of the central pipeline perforations 108. Peering into the pressure control receptacle(s) 112, one would find an elastic pressure membrane 114 (not shown for clarity).

Figure 6:
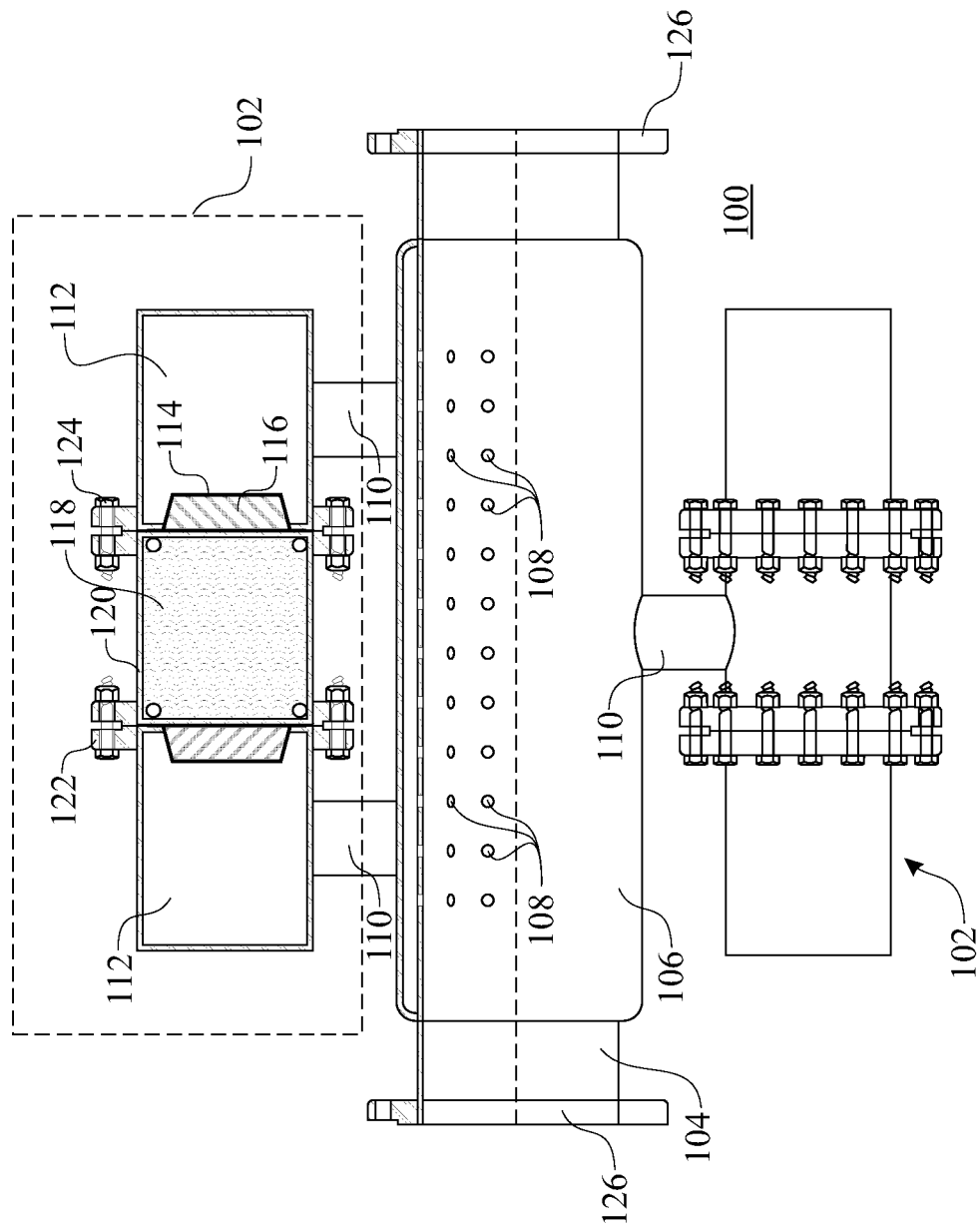
FIG. 6 presents an elevation view, including a partial sectional cut of an alternate pipeline pressure stabilizer exemplary embodiment of the present invention.

FIG. 6 presents an elevation view of the pressure stabilized pipeline system 100, presenting an alternate exemplary embodiment of the present invention. The pressure-stabilizing chamber 102 incorporates a pair of the pressure control receptacle(s) 112 positioned at opposing ends of the pressure-stabilizing chamber 102, and a dampening chamber 120 that includes the dampening porous material 118 oriented between the pair of the pressure control receptacle(s) 112. A pressure control conduit 110 is provided for each of the respective pressure control receptacle(s) 112. The elastic pressure membrane 114 is assembled to accept pressure applied by medium flowing into the pressure control receptacle(s) 112 such that, as the elastic pressure membrane 114 expands, the elastic pressure membrane 114 applies an expansion force into the dampening porous material 118.

Figure 7:
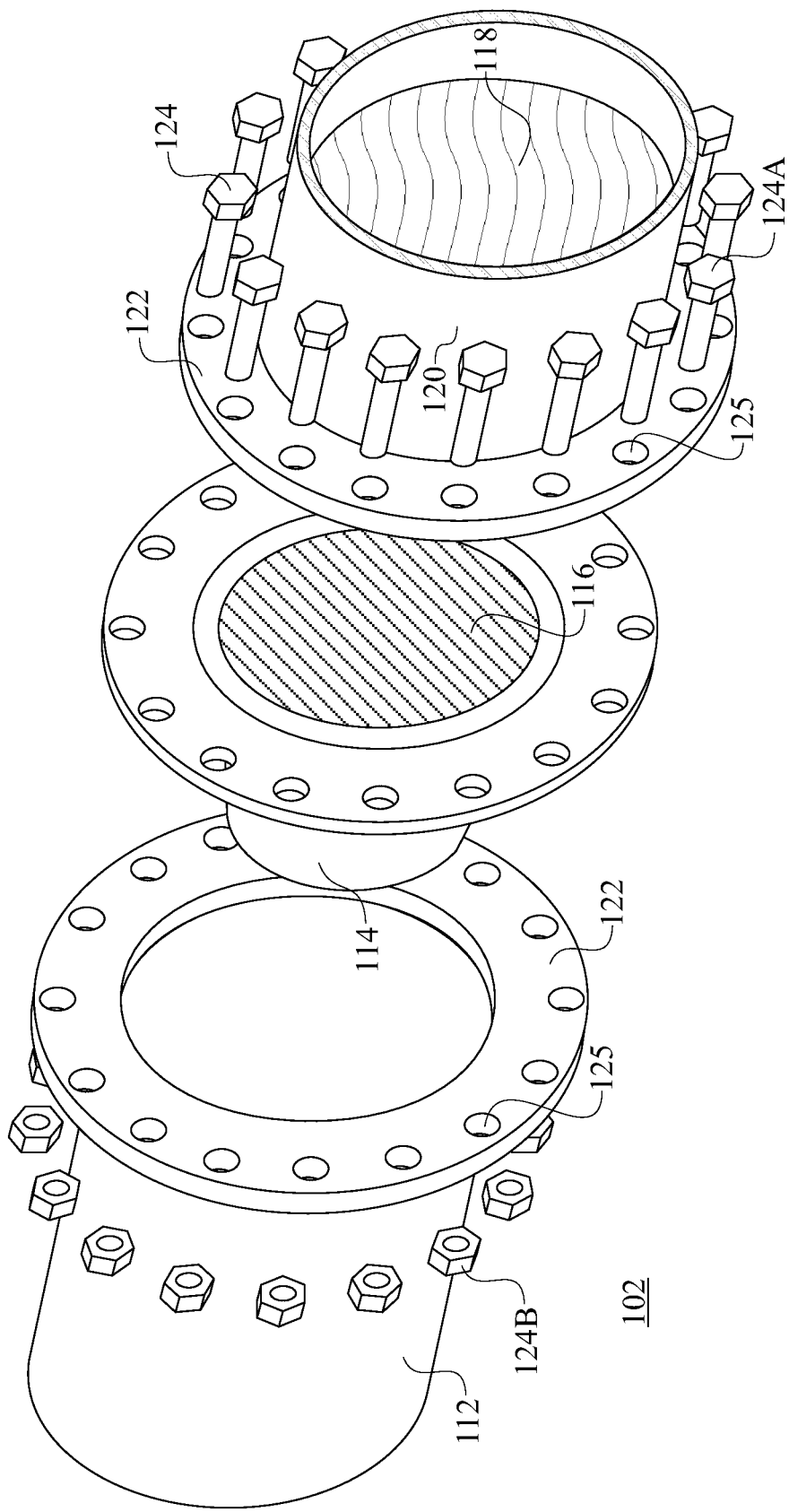
FIG. 7 presents an isometric view of an assembly drawing of the key components of the present invention.

FIG. 7 presents an isometric assembly view of a section of the pressure-stabilizing chamber 102. An elastic pressure membrane 114 is assembled at an interface between the pressure control receptacle(s) 112 and the highly porous elastomer 116; more specifically, between a pair of the stabilizing chamber assembly flange(s) 122. The pressure control receptacle(s) 112 and the highly porous elastomer 116 are mechanically coupled via a plurality of the flange fastener(s) 124, wherein the flange fastener(s) 124 is secured via a bolt 124A placed through a respective flange-coupling aperture 125 and a respective nut 124B. Optional washers (not shown) can be incorporated as desired. It is well recognized that fasteners other than nuts 124B and bolts 124A can be utilized as designed by a system engineer. The elastic pressure membrane 114 is captured between the pair of the stabilizing chamber assembly flange 122 as one form of assembly. Alternately, the elastic pressure membrane 114 can be coupled to the inside wall of the pressure control receptacle(s) 112 or highly porous elastomer 116. The dampening porous material 118 is placed within the dampening chamber 120 and positioned proximate or contacting the respective plane of the elastic pressure membrane 114, with any exposed portion of the highly porous elastomer 116 sandwiched between the elastic pressure membrane 114 and the dampening porous material 118.

Figure 8:
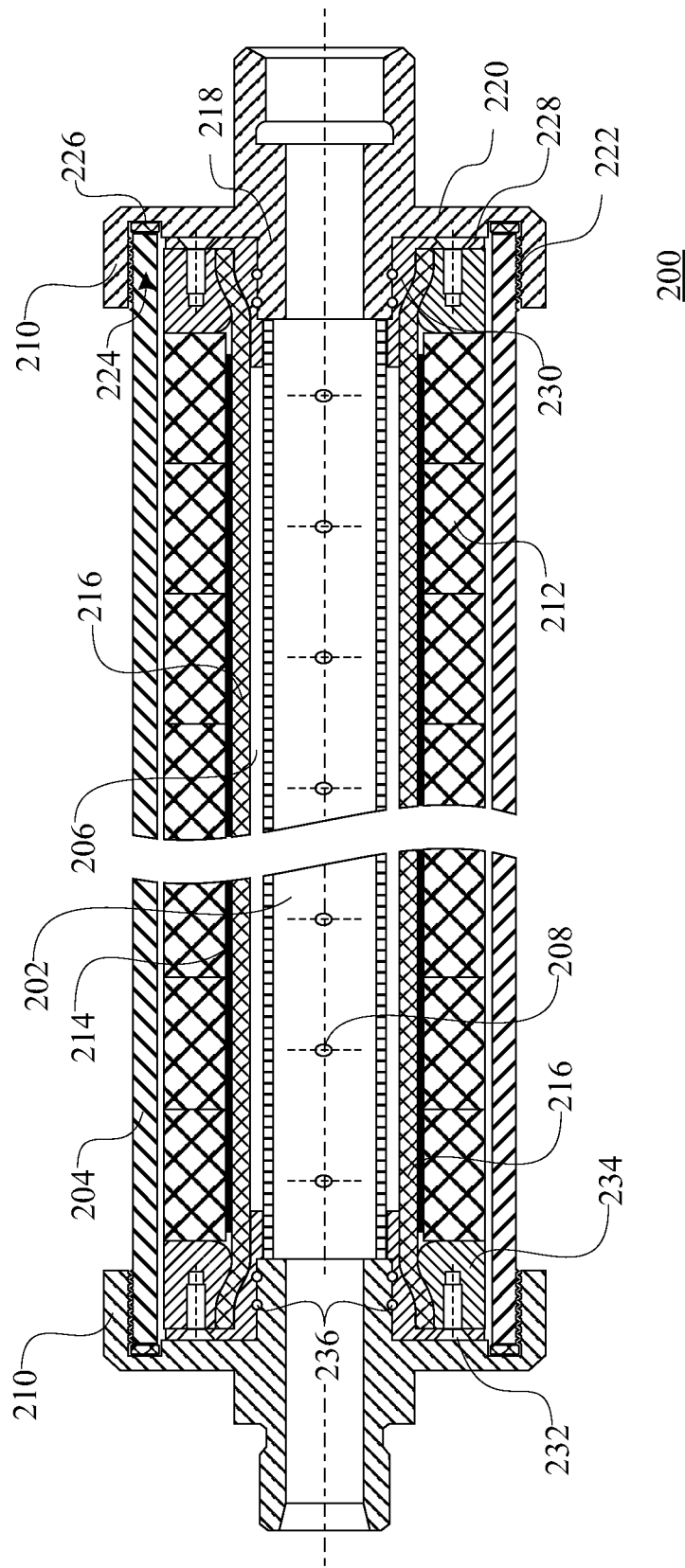
FIG. 8 presents an elevation view of an alternate embodiment of the present invention.

FIG. 8 presents an elevation view of an alternate embodiment of the present invention integrating a pipe encompassing dampening system 200 directly about a central pipeline 202. The pipe encompassing dampening system 200 includes a central pipeline 202 that provides a flow path for the medium, the flow path being linear to the pipeline. The pipe encompassing dampening system 200 is coupled to the balance of the pipeline via a pair of connection muff(s) 210, one located on each end of the central pipeline 202, wherein the connection muff(s) 210 further provides a primary assembly mechanism for the pipe encompassing dampening system 200. The connection muff(s) 210 are formed in the shape of a barrel with a pipe socket 218 located in the central part of a connection muff central section 220 of the connection muff(s) 210. A pressure stabilizing external body 204 includes a cylindrical member, is sealed on each end via the connection muff(s) 210. Each end of the pressure stabilizing external body 204 includes a threaded section 222 along the edges of the pressure stabilizing external body 204 forming a mechanical coupling and fluid tight seal with similar threaded section 222 of the connection muff(s) 210. A tightening seal 226 is provided within a receiving slot 224 for ensuring the fluid tight seal between an edge of the pressure stabilizing external body 204 and the connection muff central section 220 of the connection muff(s) 210. The sealing device is provided in the form of a flange comprising a disk shaped section 228 and a compression seal 230. The sealing device incorporates the disk shaped section 228 which transitions into a cone shaped section to define the compression seal 230, wherein the cone is directed to the other edge and its cone angle at the top is 3 degrees to 5 degrees more than the cone angle at the top of the compression seal 230. The internal diameter of a dampening securing ring 234 would be less than the external diameter of the cylinder section of the compression seal 230. The compression seal 230 is assembled to a pipe socket 218 of the connection muff(s) 210 ensuring a sufficient seal between the connection muff(s) 210 and the internal subcomponents of the connection muff central section 220. Optionally, at least one rubber ring 236 can be incorporated between the pipe socket 218 and the compression seal 230 to increase the reliability of the seal.

The medium flows into the central pipeline 202, and when pressurized, flows through the plurality of the central pipeline perforation(s) 208, filling a fluid overflow cavity 206 formed between the central pipeline 202 and an elastic separation membrane 216. The elastic separation membrane 216 then transfers the applied pressure onto a spiral springs 214. The spiral springs 214 provide a barrier between the medium and a plurality of cylindrical dampening element(s) 212. The cylindrical dampening element(s) 212 can be fabricated of a pored rubber and assembled as a plurality of rings sequentially installed in the axis direction with a gap in relation to the internal body surface pressure stabilizing external body 204. An alternate embodiment of the cylindrical dampening element(s) 212 can be fabricated of at least two of silicone, polyethylene, and rubber sections, each of said materials combined in either a non-binding or a binding manner A further embodiment of the cylindrical dampening element(s) 212 can be fabricated of shredded/chopped up sections of used tires. The spiral springs 214 are fabricated in the form of a tube made of elastic material. The spiral springs 214 is assembled in a manner to encompass the elastic separation membrane 216 with the formation in the case of the gap between the internal surface of the latest and smooth external surface of the central pipeline 202.

The elastic separation membrane 216 is assembled in a manner similar to the in assembly to that described respective to the internal body surface pressure stabilizing external body 204, noting that a dampening securing ring 234 is mounted using a plurality of ring fastener(s) 232. The ring fastener(s) 232 are placed through holes within the disk shaped section 228 and against the dampening securing ring 234. As a pressure force is applied to the cylindrical dampening element(s) 212, the circumferential design dissipates a portion of the pressure. The compression translates into an axial force, expanding the plurality of the cylindrical dampening element(s) 212 axially into the dampening securing rings 234. The conical surface of the cylindrical dampening element(s) 212 and respective the dampening securing rings 234 provides a constant chocking load, thus providing additional tightening.

The pressure stabilizer functions as follows. In the initial condition, the working medium (fluid) is transported along the main pipeline, through the connection muff(s) 210 and into the central pipeline 202. As the working medium flows through the central pipeline 202, it flows through the plurality of the central pipeline perforation(s) 208 filling the fluid overflow cavity 206 provided as a gap between the external surface of the central pipeline 202 and the internal section of the elastic separation membrane 216.

In the case of a rapid increase of the working medium pressure within the central pipeline 202, the additional flow of the working medium passes through the plurality of the central pipeline perforation(s) 208 and causing the elastic separation membrane 216 to extend deforming the sections of the spiral springs 214, wherein the spiral springs 214 interacts with the plurality of rings of the cylindrical dampening element(s) 212. This causes the elimination of the gap between the internal surface of the pressure stabilizing external body 204 and the external surface of the cylindrical dampening element(s) 212, increasing the gap between the internal surface of the elastic separation membrane 216 and the external surface of the central pipeline 202. As the working medium continues to pass, the transfer of fluid to the fluid overflow cavity 206 and wherein the excess working medium applies pressure to the spiral springs 214, the change in pressure is reduced, as is the overall pressure within the central pipeline 202.

As the pressure of the working medium is reduced within the central pipeline 202, the elastic separation membrane 216 (under the effect of the elastic force from part of the sections of the spiral springs 214 and the cylindrical dampening element(s) 212) returns to the initial position. This causes the working medium to flow back into the central pipeline 202, thus increasing the pressure within of the working medium within the central pipeline 202.

In both increasing and decreasing pressure scenarios, the elastic dampening of pressure oscillation on the elastic stabilizer elements (the elastic separation membrane 216, the spiral springs 214, and the cylindrical dampening element(s) 212) provides the intense dissipation of energy. Additionally, the energy is further dissipated via the plurality of the central pipeline perforation(s) 208, via friction from the coil springs of the spiral springs 214 forces provided by the cylindrical dampening element(s) 212, as well as friction of the spiral springs 214 between themselves and on the internal surface of the central pipeline 202.

The range of dampened pressure oscillation frequencies is determined by the range of change of the total area of the central pipeline perforation(s) 208, the elastic properties of the elastic separation membrane 216, the spiral springs 214, and the cylindrical dampening element(s) 212.

Using the pipe encompassing dampening system 200 provides the following advantages in comparison with existing devices:

Filling the cavities between the external surface of elastic separation membrane 216 and the internal surface of the pressure stabilizing external body 204, provided by the cylindrical dampening element(s) 212 (fabricated of an elastic material and provided in the form factor of rings), allows an increase in the amplitude of the dampened oscillations and widening of the range of the operational pressures.

Additionally, the absence in the in the tightening unit of elastic stub division as well as their absence on the central pipeline 202, increases the durability of the dampener.

Accordingly, the use of the present invention provides an improved dampening and pressure dissipative stabilizer; optimizing the operational modes and reliability of the overall system.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

The Applicant has provided a method and apparatus, with several options, for creating and using a pressure-stabilizing device in conjunction with a working medium pipeline. Although the apparatus and methods taught herein are the preferred and alternate embodiments, it can be recognized that other form factors, materials, and methods of achieving the same results can be contrived from the disclosed teachings.

What is claimed is:

1. A method of stabilizing pressure within a pipe system, the method comprising steps:
   assembling a pressure-stabilizing pipeline enclosure into a pipeline system, wherein the central pipeline is provided in fluid communication with the pipeline system, wherein the pressure-stabilizing pipeline enclosure comprises a plurality of perforations provided therein, the perforations being spatially arranged through a wall of the central pipeline along a portion of a length of the pipeline enclosure,
   flowing a fluid through the pipeline system;
   introducing a pressure wave into the flowing fluid which causes a portion of the fluid to flow through the plurality of perforations and into at least one pressure stabilizing chamber, each at least one pressure stabilizing chamber comprising a sealed member having a pressure control receptacle in fluid communication with the pressure-stabilizing pipeline enclosure, an elastic pressure membrane supported about a peripheral edge in a generally planar configuration creating a tensile spring characteristic, the elastic pressure membrane having a first surface in fluid communication with the pressure control receptacle, and a dampening porous material provided within a chamber formed on an opposite side of said elastic pressure membrane, wherein the dampening porous material is configured supporting an opposite surface of the elastic pressure membrane;
   increasing a fluid pressure within the pressure control receptacle; and
   absorbing forces generated by the increase in pressure within the pressure control receptacle, wherein the forces are absorbed by a combination of a tensile force provided by stretching the elastic pressure membrane against the supported peripheral edge thereof and a biasing force applied by the dampening porous material.

2. A method of stabilizing pressure within a pipe system as recited in claim 1, the method further comprising steps of:
   passing a portion of the fluid into a dampening build up section formed between an exterior surface of the central pipeline and an interior surface of the pressure-stabilizing pipeline enclosure; and
   transferring a portion of the fluid flowing through said dampening build up section into at least one pressure control receptacle, wherein the elastic pressure membrane forms a portion of a surface of the pressure control receptacle; and
   dampening the pressure wave by subjecting the elastic pressure membrane to the portion of the fluid flowing through said dampening build up section.

3. A method of stabilizing pressure within a pipe system as recited in claim 2, wherein said step of absorbing forces generated by the increase in pressure within the pressure control receptacle is enhanced by placing the dampening porous material within a dampening chamber and the method further comprising a step of:
   retaining a shape of the dampening porous material against a rigid surface of the dampening chamber, focusing distortion of the dampening porous material against the opposite surface of the elastic pressure membrane.

4. A method of stabilizing pressure within a pipe system as recited in claim 1, the method further comprising steps of:
   passing a portion of the fluid into a dampening build up section formed between an exterior surface of the central pipeline and an interior surface of the pressure-stabilizing pipeline enclosure; and
   transferring a portion of the fluid flowing through said dampening build up section into a plurality of pressure control receptacles, wherein each pressure control receptacle comprises at least one elastic pressure membrane and each at the one elastic pressure membrane forms a portion of a surface of each respective pressure control receptacle; and
   dampening the pressure wave by subjecting the elastic pressure membrane to the portion of the fluid flowing through said dampening build up section.

5. A method of stabilizing pressure within a pipe system as recited in claim 4, wherein said step of absorbing forces generated by the increase in pressure within the pressure control receptacle is enhanced by placing the dampening porous material within a dampening chamber and the method further comprising a step of:
   retaining a shape of the dampening porous material against a rigid surface of the dampening chamber, focusing distortion of the dampening porous material against the opposite surface of the elastic pressure membrane.

6. A method of stabilizing pressure within a pipe system as recited in claim 1, the method further comprising a step of:
   supporting the elastic pressure membrane peripheral edge by entrapping the edge between two adjoining flanges.

7. A method of stabilizing pressure within a pipe system as recited in claim 1, the method further comprising a step of:
   engineering a dampening effect of the dampening porous material by creating the dampening porous material by combining at least two different materials.

8. A method of stabilizing pressure within a pipe system as recited in claim 1, the method further comprising a step of:
   fabricated the dampening porous material by grinding used tires.

9. A method of stabilizing pressure within a pipe system as recited in claim 1, the method further comprising a step of:
   fabricated the dampening porous material by grinding used tires and pouring in a filler material.

10. A method of stabilizing pressure within a pipe system, the method comprising steps:
   assembling a pressure-stabilizing pipeline enclosure into a pipeline system, wherein the central pipeline is provided in fluid communication with the pipeline system, wherein the pressure-stabilizing pipeline enclosure comprises a plurality of perforations provided therein, the perforations being spatially arranged through a wall of the central pipeline along a portion of a length of the pipeline enclosure, flowing a fluid through the pipeline system;

introducing a pressure wave into the flowing fluid causing a portion of the fluid to flow through the plurality of perforations and into dampening buildup section formed between an exterior surface of the central pipeline and an interior surface of the pressure-stabilizing pipeline enclosure and subsequently a portion of the fluid flowing from the dampening buildup section into a pressure control receptacle, wherein the pressure control receptacle includes at least one elastic pressure membrane spanning across a portion of a surface defining the pressure control receptacle and having a dampening porous material encased within a dampening chamber located on an opposite side of the elastic pressure membrane, wherein the dampening porous material is configured supporting an opposite surface of the elastic pressure membrane;

increasing a fluid pressure within the pressure control receptacle; and absorbing forces generated by the increase in pressure within the pressure control receptacle, wherein the forces are absorbed by a combination of a tensile force provided by stretching the elastic pressure membrane against the supported peripheral edge thereof and a biasing force applied by the dampening porous material.

11. A method of stabilizing pressure within a pipe system as recited in claim 10, the method further comprising steps of:

passing a portion of the fluid into a dampening build up section formed between an exterior surface of the central pipeline and an interior surface of the pressure-stabilizing pipeline enclosure; and transferring a portion of the fluid flowing through said dampening build up section into at least one pressure control receptacle, wherein the elastic pressure membrane forms a portion of a surface of the pressure control receptacle; and dampening the pressure wave by subjecting the elastic pressure membrane to the portion of the fluid flowing through said dampening build up section.

12. A method of stabilizing pressure within a pipe system as recited in claim 11, wherein said step of absorbing forces generated by the increase in pressure within the pressure control receptacle is enhanced by placing the dampening porous material within a dampening chamber and the method further comprising a step of:

retaining a shape of the dampening porous material against a rigid surface of the dampening chamber, focusing distortion of the dampening porous material against the opposite surface of the elastic pressure membrane.

13. A method of stabilizing pressure within a pipe system as recited in claim 10, the method further comprising steps of:

passing a portion of the fluid into a dampening build up section formed between an exterior surface of the central pipeline and an interior surface of the pressure-stabilizing pipeline enclosure; and transferring a portion of the fluid flowing through said dampening build up section into a plurality of pressure control receptacles, wherein each pressure control receptacle comprises at least one elastic pressure membrane and each at the one elastic pressure membrane forms a portion of a surface of each respective pressure control receptacle; and dampening the pressure wave by subjecting the elastic pressure membrane to the portion of the fluid flowing through said dampening build up section.

14. A method of stabilizing pressure within a pipe system as recited in claim 13, wherein said step of absorbing forces generated by the increase in pressure within the pressure control receptacle is enhanced by placing the dampening porous material within a dampening chamber and the method further comprising a step of:

retaining a shape of the dampening porous material against a rigid surface of the dampening chamber, focusing distortion of the dampening porous material against the opposite surface of the elastic pressure membrane.

15. A method of stabilizing pressure within a pipe system as recited in claim 10, the method further comprising a step of:

supporting the elastic pressure membrane peripheral edge by entrapping the edge between two adjoining flanges.

16. A method of stabilizing pressure within a pipe system as recited in claim 10, the method further comprising a step of:

engineering a dampening effect of the dampening porous material by creating the dampening porous material by combining at least two different materials.

17. A method of stabilizing pressure within a pipe system as recited in claim 10, the method further comprising a step of:

fabricated the dampening porous material by grinding used tires.

18. A method of stabilizing pressure within a pipe system as recited in claim 10, the method further comprising a step of:

fabricated the dampening porous material by grinding used tires and pouring in a filler material.

* * * * *